United States Patent
Yan et al.

(10) Patent No.: US 11,935,210 B2
(45) Date of Patent: Mar. 19, 2024

(54) SYSTEM AND METHOD FOR FISHEYE IMAGE PROCESSING

(71) Applicant: TUSIMPLE, INC., San Diego, CA (US)

(72) Inventors: Zhipeng Yan, San Diego, CA (US); Pengfei Chen, San Diego, CA (US); Panqu Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 321 days.

(21) Appl. No.: 17/018,627

(22) Filed: Sep. 11, 2020

(65) Prior Publication Data
US 2020/0410634 A1 Dec. 31, 2020

Related U.S. Application Data

(63) Continuation of application No. 16/165,951, filed on Oct. 19, 2018, now Pat. No. 10,796,402.

(51) Int. Cl.
*G06T 3/00* (2006.01)
*G05D 1/00* (2006.01)
(Continued)

(52) U.S. Cl.
CPC ......... *G06T 3/0018* (2013.01); *G05D 1/0246* (2013.01); *G06T 5/006* (2013.01); *G06T 5/20* (2013.01); *G06T 2207/30252* (2013.01)

(58) Field of Classification Search
CPC ......... G06T 3/0018; G06T 5/006; G06T 5/20; G06T 2207/30252; G06T 2207/20021;
(Continued)

(56) References Cited

U.S. PATENT DOCUMENTS 6,777,904 B1  8/2004  Degner
7,103,460 B1  9/2006  Breed
(Continued)

FOREIGN PATENT DOCUMENTS

CN  101783011 A    7/2010
CN  201892936 U  * 7/2011
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Mekonen T Bekele
(74) *Attorney, Agent, or Firm* — Perkins Coie LLP

(57) ABSTRACT

A system and method for fisheye image processing can be configured to: receive fisheye image data from at least one fisheye lens camera associated with an autonomous vehicle, the fisheye image data representing at least one fisheye image frame; partition the fisheye image frame into a plurality of image portions representing portions of the fisheye image frame; warp each of the plurality of image portions to map an arc of a camera projected view into a line corresponding to a mapped target view, the mapped target view being generally orthogonal to a line between a camera center and a center of the arc of the camera projected view; combine the plurality of warped image portions to form a combined resulting fisheye image data set representing recovered or distortion-reduced fisheye image data corresponding to the fisheye image frame; generate auto-calibration data representing a correspondence between pixels in the at least one fisheye image frame and corresponding pixels in the combined resulting fisheye image data set; and
(Continued)

provide the combined resulting fisheye image data set as an output for other autonomous vehicle subsystems.

20 Claims, 10 Drawing Sheets

(51) Int. Cl.
  *G06T 5/00* (2006.01)
  *G06T 5/20* (2006.01)
(58) Field of Classification Search
  CPC ... G06T 3/4038; G06T 3/0062; G05D 1/0246; B60R 1/00; B60R 2300/105; B60R 2300/303; G06V 20/58
  See application file for complete search history.

(56) References Cited

U.S. PATENT DOCUMENTS

| | | | |
|---|---|---|---|
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,971,666 B2 | 3/2015 | Yu | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 9,953,236 B1 | 4/2018 | Huang | |
| 10,067,509 B1 | 9/2018 | Wang | |
| 10,354,151 B2 | 7/2019 | Yoon | |
| 10,528,851 B2 | 1/2020 | Zhu | |
| 10,796,402 B2* | 10/2020 | Yan | G06T 3/4038 |
| 10,846,831 B2* | 11/2020 | Raduta | G06T 5/006 |
| 2007/0230792 A1 | 10/2007 | Shashua | |
| 2008/0249667 A1 | 10/2008 | Horvitz | |
| 2009/0040054 A1 | 2/2009 | Wang | |
| 2010/0049397 A1 | 2/2010 | Lin | |
| 2010/0226564 A1 | 9/2010 | Marchesotti et al. | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |
| 2017/0118475 A1* | 4/2017 | Chang | H04N 19/56 |
| 2018/0307922 A1 | 10/2018 | Yoon | |
| 2019/0149751 A1 | 5/2019 | Wise | |
| 2019/0337344 A1 | 11/2019 | Yu | |
| 2020/0074639 A1 | 3/2020 | Zhao | |
| 2020/0117918 A1 | 4/2020 | Wallin | |

FOREIGN PATENT DOCUMENTS

| | | |
|---|---|---|
| CN | 103996172 A | 8/2014 |
| CN | 105184756 A | 12/2015 |
| CN | 106327478 A | 1/2017 |
| CN | 106357991 A | 1/2017 |
| CN | 106815808 A | 6/2017 |
| CN | 106875339 A | 6/2017 |
| CN | 107424120 A | 12/2017 |
| EP | 1754179 A1 | 2/2007 |
| EP | 2448251 A2 | 5/2012 |
| EP | 2463843 A2 | 6/2012 |
| EP | 2523163 A1 | 11/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| JP | H11261868 A | 9/1999 |
| JP | 2010140292 A | 6/2010 |
| WO | WO/2005/098739 A1 | 10/2005 |

(56) References Cited

FOREIGN PATENT DOCUMENTS

| WO | WO/2005/098751 A1 | 10/2005 |
|---|---|---|
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching For Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985,pp. 1-4,Feb. 25, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.

Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.

Li, Yanghao and Wang, Naiyan and Liu, Jiaying and Hou, Xiaodi, "Factorized Bilinear Models for Image Recognition", arXiv preprint arXiv:1611.05709, pp. 1-9, Nov. 17, 2016.

Hou, Xiaodi, "Computational Modeling and Psychophysics in Low and Mid-Level Vision", California Institute of Technology, pp. i to xi and 1-114, May 7, 2014.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521,pp. 12-23, Jan. 1, 2001.

Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV], pp. 1-8, Dec. 20, 2016.

Schroff, Florian, Dmitry Kalenichenko, James Philbin, (Google), "FaceNet: A Unified Embedding for Face Recognition and Clustering", CVPR Jun. 17, 2015.

Dai, Jifeng, Kaiming He, Jian Sun, (Microsoft Research), "Instance-aware Semantic Segmentation via Multi-task Network Cascades", CVPR, pp. 1-10, Dec. 17, 2015.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.

Tian Li, "Proposal Free Instance Segmentation Based on Instance-aware Metric", Department of Computer Science, Cranberry-Lemon University, Pittsburgh, PA., pp. 1-2, 2015.

Mohammad Norouzi, David J. Fleet, Ruslan Salakhutdinov, "Hamming Distance Metric Learning", Departments of Computer Science and Statistics, University of Toronto, pp. 1-9, 2012.

Jain, Suyong Dutt, Grauman, Kristen, "Active Image Segmentation Propagation", In Proceedings of the IEEE Conference on Computer Vision and Pattern Recognition (CVPR), pp. 1-10, Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.

Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtaINIPS10.pdf, pp. 1-9, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, pp. 298-312, Mar. 2007.

(56) References Cited

OTHER PUBLICATIONS

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada,pp. 1-11, 2016.

Adhiraj Somani, Nan Ye, David Hsu, and Wee Sun Lee, "DESPOT: Online POMDP Planning with Regularization", Department of Computer Science, National University of Singapore, pp. 1-9, 2013.

Adam Paszke, Abhishek Chaurasia, Sangpil Kim, and Eugenio Culurciello. Enet: A deep neural network architecture for real-time semantic segmentation. CoRR, abs/1606.02147, pp. 1-10, 2016.

Szeliski, Richard, "Computer Vision: Algorithms and Applications" http://szeliski.org/Book/, pp. i toxxii and 1-957, 2010.

* cited by examiner

SYSTEM AND METHOD FOR FISHEYE IMAGE PROCESSING

CROSS-REFERENCE TO RELATED APPLICATIONS

This application is a continuation of U.S. patent application Ser. No. 16/165,951, titled, "System and Method for Fisheye Image Processing," filed Oct. 19, 2018, published as U.S. 2020-0126179, the disclosure of which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2017-2018, TuSimple, All Rights Reserved.

TECHNICAL FIELD

This patent document pertains generally to tools (systems, apparatuses, methodologies, computer program products, etc.) for image processing, vehicle control systems, and autonomous driving systems, and more particularly, but not by way of limitation, to a system and method for fisheye image processing.

BACKGROUND

Object detection is a fundamental problem for numerous vision tasks, including image segmentation, semantic instance segmentation, and detected object reasoning. Detecting all objects in a traffic environment, such as cars, buses, pedestrians, and bicycles, is crucial for building an autonomous driving system. Failure to detect an object (e.g., a car or a person) may lead to malfunction of the motion planning module of an autonomous driving car, thus resulting in a catastrophic accident. As such, object detection for autonomous vehicles is an important operational and safety issue.

Object detection can involve the analysis of images and the use of semantic segmentation on the images. Semantic segmentation aims to assign a categorical label to every pixel in an image, which plays an important role in image analysis and self-driving systems. The semantic segmentation framework provides pixel-level categorical labeling, but no single object-level instance can be discovered.

Fisheye lenses and fisheye lens cameras are widely used in daily life. These types of lenses are commonly installed on vehicles, surveillance cameras, telescopes, and the like to achieve extremely wide fields of view. However, the convenience of the fisheye lens wide field of view comes at the cost of a high level of distortion in the images. Conventional image processing techniques, such as object detection, typically cannot recover the shape or position of the object or deal with the distortion problem in the images produced with a fisheye lens. Traditional fisheye lens image distortion reducing algorithms are too difficult to modify or adapt to an object detection application, such as autonomous vehicle control systems.

SUMMARY

A system and method for fisheye image processing are disclosed. The example system and method for fisheye image processing can include a fisheye image processing system configured to receive fisheye image data from at least one fisheye lens camera associated with an autonomous vehicle. In various example embodiments disclosed herein, a fast end-to-end processing method is described for fisheye lens image data processing. The described data processing method can transform fisheye images to normal (non-distorted) images with an adjustable output size, field of view, and rotational orientation. The processing method of the example embodiments is fully optimized to achieve real-time efficiency (e.g., 50 Hz@720p). Additionally, the example embodiments provide an auto-calibration method that fits the processing method to any fisheye lens with a minimum of human effort. In the various example embodiments disclosed herein, the fisheye lens image processing method can remove the distortion from fisheye images and recover the scene and objects from the images without distortion as if the images were captured by a normal (non-fisheye) lens. Details of the various example embodiments are provided below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for fisheye image processing are disclosed. The example system and method for fisheye image processing can include a fisheye image processing system configured to receive fisheye image data from at least one fisheye lens camera associated with an autonomous vehicle. In various example embodiments disclosed herein, a fast end-to-end processing method is described for fisheye lens image data processing. The described data processing method can transform fisheye images to normal (non-distorted) images with an adjustable output size, field of view, and rotational orientation. The processing method of the example embodiments is fully optimized to achieve real-time efficiency (e.g., 50 Hz@1280p). Additionally, the example embodiments provide an auto-calibration method that fits the processing method to any fisheye lens with a minimum of human effort. In the various example embodiments disclosed herein, the fisheye lens image processing method can remove the distortion from fisheye images and recover the scene and objects from the images without distortion as if the images were captured by a normal (non-fisheye) lens.

An example embodiment disclosed herein can be used in the context of an in-vehicle control system 150 in a vehicle ecosystem 101. In one example embodiment, an in-vehicle control system 150 with a fisheye image processing module 200 resident in a vehicle 105 can be configured like the architecture and ecosystem 101 illustrated in FIG. 1. However, it will be apparent to those of ordinary skill in the art that the fisheye image processing module 200 described and claimed herein can be implemented, configured, and used in a variety of other applications and systems as well.

Figure 1:
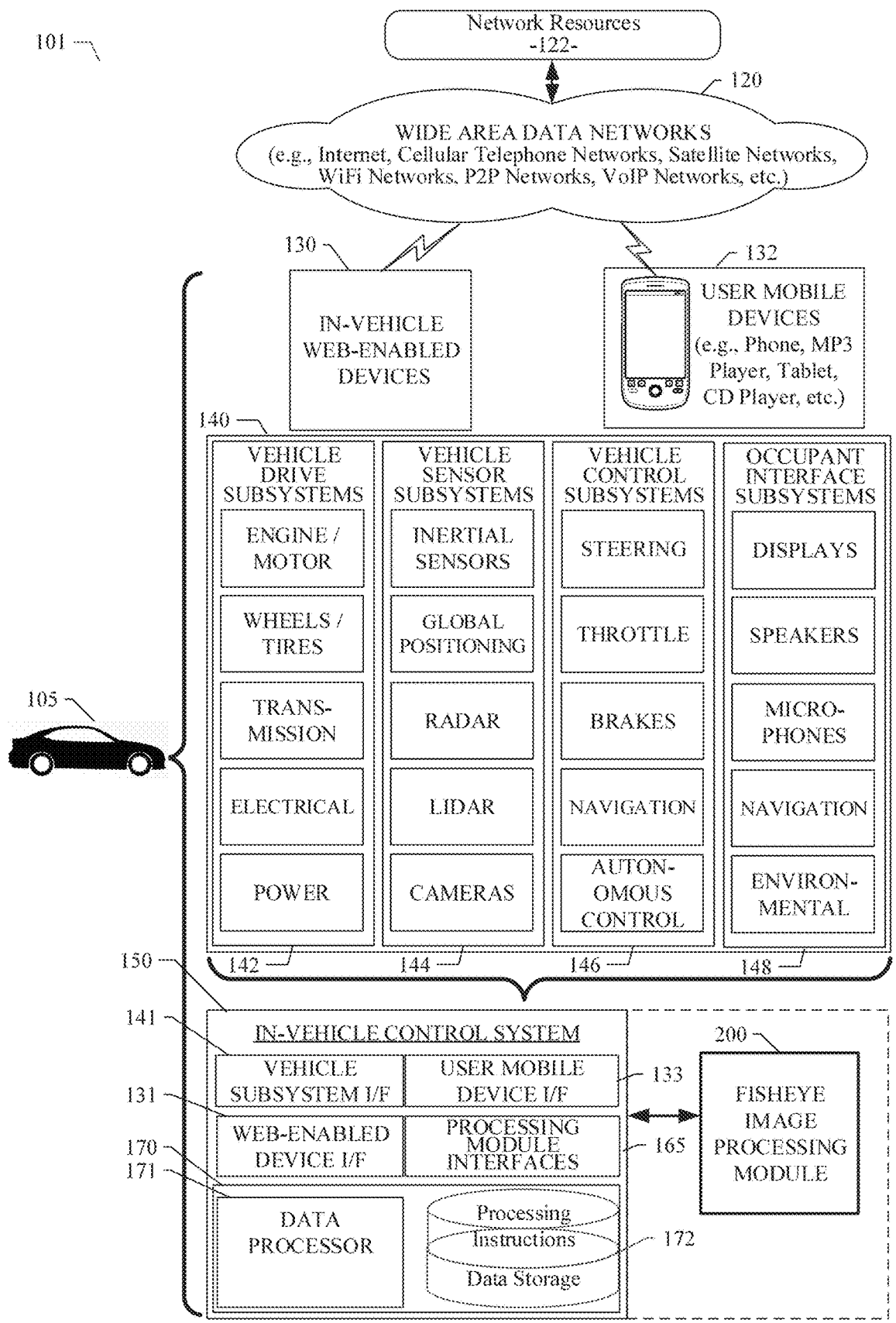
FIG. 1 illustrates a block diagram of an example ecosystem in which an in-vehicle image processing module of an example embodiment can be implemented.

Referring now to FIG. 1, a block diagram illustrates an example ecosystem 101 in which an in-vehicle control system 150 and a fisheye image processing module 200 of an example embodiment can be implemented. These components are described in more detail below. Ecosystem 101 includes a variety of systems and components that can generate and/or deliver one or more sources of information/data and related services to the in-vehicle control system 150 and the fisheye image processing module 200, which can be installed in the vehicle 105. For example, a camera with a fisheye lens installed in or on the vehicle 105, as one of the devices of vehicle subsystems 140, can generate fisheye image and timing data that can be received by the in-vehicle control system 150. One or more of the cameras installed in or on the vehicle 105 can be equipped with a fisheye lens to capture fisheye images of the environment around the vehicle 105. The in-vehicle control system 150 and the fisheye image processing module 200 executing therein can receive this fisheye image and timing data input. As described in more detail below, the fisheye image processing module 200 can process the fisheye image input and enable the removal of image distortion and the extraction of object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the fisheye image processing module 200 for processing fisheye image data received from one or more of the vehicle subsystems 140. The data processor 171 can be combined with a data storage device 172 as part of a computing system 170 in the in-vehicle control system 150. The data storage device 172 can be used to store data, processing parameters, fisheye camera parameters, and data processing instructions. A processing module interface 165 can be provided to facilitate data communications between the data processor 171 and the fisheye image processing module 200. In various example embodiments, a plurality of processing modules, configured similarly to fisheye image processing module 200, can be provided for execution by data processor 171. As shown by the dashed lines in FIG. 1, the fisheye image processing module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the fisheye image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the fisheye image processing module 200 can receive web-based data or content via an in-vehicle web-enabled device interface 131, which can be used to connect with the in-vehicle web-enabled device receiver 130 and network 120. In this manner, the in-vehicle control system 150 and the fisheye image processing module 200 can support a variety of network-connectable in-vehicle devices and systems from within a vehicle 105.

As shown in FIG. 1, the in-vehicle control system 150 and the fisheye image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the fisheye image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the fisheye image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the fisheye image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the fisheye image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the fisheye image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the fisheye image processing module 200, move in a controlled manner, or follow a path or trajectory based on output generated by the fisheye image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and fisheye image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the fisheye image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the fisheye image processing module 200 can be implemented as in-vehicle components of vehicle 105. In various example embodiments, the in-vehicle control system 150 and the fisheye image processing module 200 in data communication therewith can be implemented as integrated components or as separate components. In an example embodiment, the software components of the in-vehicle control system 150 and/or the fisheye image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Fisheye Image Processing

Figure 2:
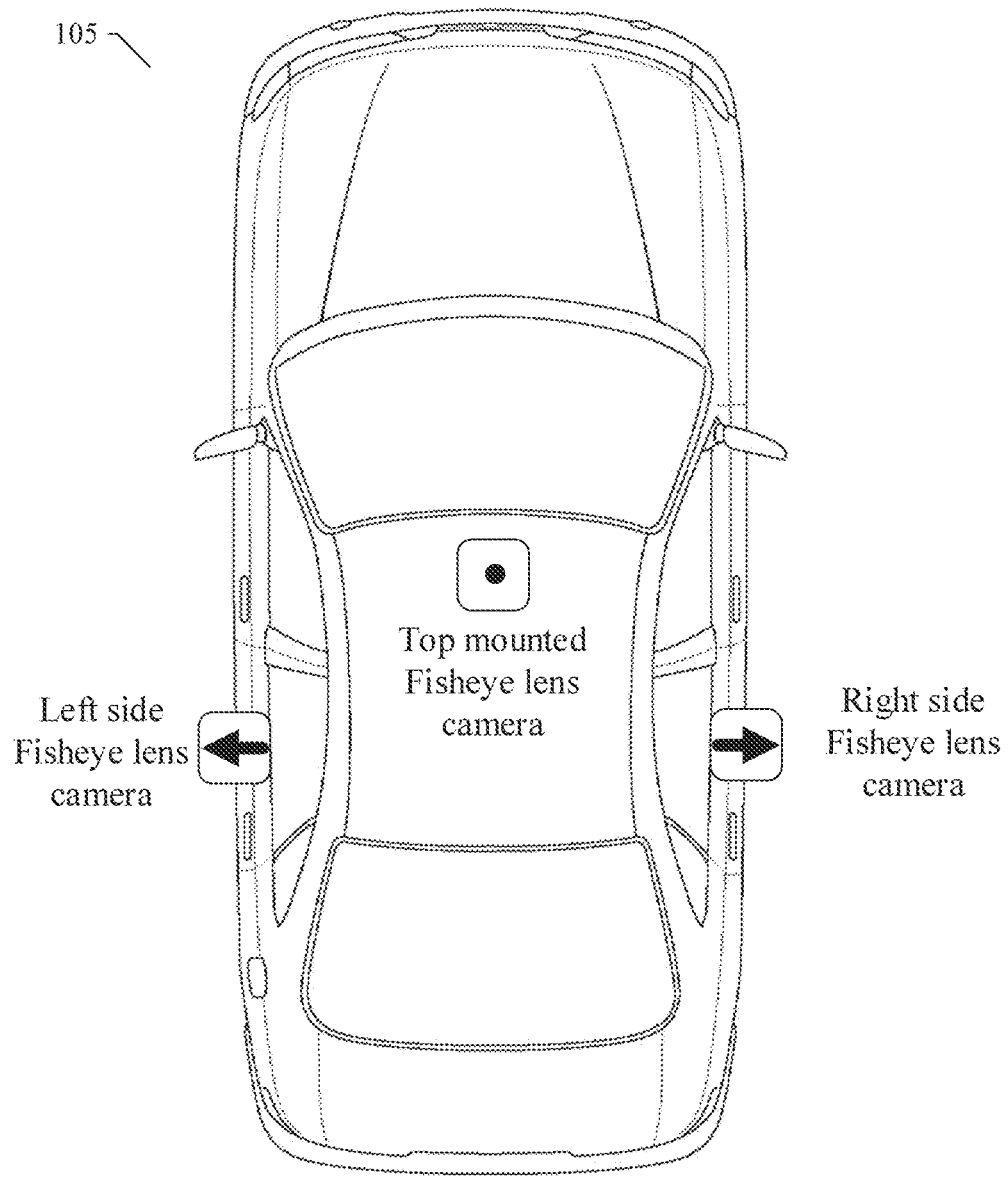
FIG. 2 illustrates an example of an autonomous or host vehicle with a plurality of fisheye lens cameras.

A system and method for fisheye image processing are disclosed. The example system and method for fisheye image processing can include a fisheye image processing system configured to receive fisheye image data from at least one fisheye lens camera associated with an autonomous vehicle. In an example embodiment, an autonomous or host vehicle 105 can be configured to include one or more fisheye lens cameras. For example, the one or more cameras installed in or on the vehicle 105 can be oriented to capture images on a side, front, rear, or the top of the vehicle 105. An example of a vehicle 105 with a plurality of fisheye lens cameras is illustrated in FIG. 2. In the example shown, an autonomous or host vehicle 105 can be configured with a left side fisheye lens camera, a right side fisheye lens camera, and/or a top mounted fisheye lens camera. It will be apparent to those of ordinary skill in the art that a greater or lesser quantity of fisheye lens cameras and any variation on the positioning of the fisheye lens cameras can be used for a particular application of the technology described herein. Each of the plurality of fisheye lens cameras can be configured to transfer fisheye image data to the in-vehicle control system 150 of the autonomous vehicle 105 and the fisheye image processing module 200 therein.

Figure 3:
FIG. 3 illustrates conventional or current technology that uses a whole image received from a fisheye lens camera.

Referring now to FIG. 3, conventional technology typically uses fisheye lens cameras to capture distorted images of the area surrounding the autonomous vehicle. Fisheye lens images are useful for autonomous vehicles, because a wide area around the vehicle can be imaged. However, because of the distortion produced by the fisheye lens, conventional image processing and object detection systems can have difficulty in reliably detecting objects in the distorted images. Although there are known techniques for applying mathematical transformations to fisheye images to reduce the distortion, these techniques do not always yield satisfactory results. In particular, the known fisheye image mathematical transformation techniques process the fisheye image as a whole image. However, the closer an object in the fisheye image is to the image boundary, the more severe the object distortion will be. Because the conventional fisheye image processing techniques treat the fisheye image, and all the objects in the image, as a whole, the conventional techniques cannot provide image processing variability, location-specific processing, or object-specific processing of the fisheye image. In particular, the conventional techniques will compromise the recovery quality (e.g., distortion reduction) of objects on the image boundary to enhance the recovery quality of objects in the center of the image. Thus, the known fisheye image mathematical transformation techniques and conventional fisheye image processing techniques are not satisfactory for use in autonomous vehicles.

The example system and method for fisheye image processing of the example embodiments disclosed herein improve the existing fisheye image processing techniques by splitting or partitioning the original fisheye image or image frame into smaller portions and applying a fisheye image processing method separately to each image portion. Because the original fisheye image frame is partitioned into a plurality of portions, each image portion can be processed in a specific (and variable) manner to optimize the recovery quality (e.g., distortion reduction) for objects in that image portion. Once each image portion is independently processed, the processed image portions can be stitched or combined together to reconstitute the whole image corresponding to the original fisheye image frame. Because each image portion can be processed differently to optimize the recovery quality for that image portion, the objects throughout the entire image can be effectively, variably, and specifically recovered (e.g., distortion removed) without compromising the recovery of any objects in the image. This represents a significant improvement over the existing technologies.

Figure 4:
FIG. 4 illustrates an example of a plurality of processed image portions as shown in the upper part of the diagram and an example of the resulting image after the plurality of processed image portions have been stitched together or combined as shown in the lower part of the diagram.

The difference between a fisheye lens and a normal lens is that the fisheye lens is typically fabricated in a cube or spherical shape and able to receive light from a wide angle (normally greater than 180 degrees). The fisheye lens can map all image objects onto a single frame through known mathematical transformations. The distortion is introduced when objects near the image boundary (e.g., proximate to the lens) are captured and mapped into the same frame as the objects at the image center (e.g., distal to the lens). In an example embodiment, the parameters of the fisheye lens (e.g., the fisheye lens radius, the lens aperture, the focal length, the target field of view angle, etc.) for each of the fisheye cameras on the autonomous vehicle 105 can be pre-defined or otherwise obtained based on the type of camera, type of lens, manner of installation, and the like. In an operational mode, the fisheye image processing module 200 of an example embodiment can receive fisheye image data from each of the fisheye cameras and partition the original fisheye images into a plurality of image portions as described above. The fisheye image processing module 200 can calculate the transformations and, most importantly, estimate the actual position of the distorted objects in the original fisheye image relative to the image center. Then, the fisheye image processing module 200 can map the texture of those objects to their actual position in the processed image and make the resulting processed image much more authentic than the original fisheye image. Additionally, the mapped objects can be oriented or aligned orthogonally relative to the autonomous vehicle 105, which improves the ability of other autonomous vehicle subsystems to determine the motion and intention characteristics of the objects (e.g. other vehicles) proximate to the autonomous vehicle 105. In a particular embodiment, the mapped objects can be aligned based on a line parallel to a side of the autonomous or host vehicle 105. FIG. 4 illustrates an example of a plurality of processed image portions as shown in the upper part of the diagram and an example of the resulting image after the plurality of processed image portions have been stitched or combined together as shown in the lower part of the diagram. More details of the process in an example embodiment are provided below and in the accompanying figures.

Figure 5:
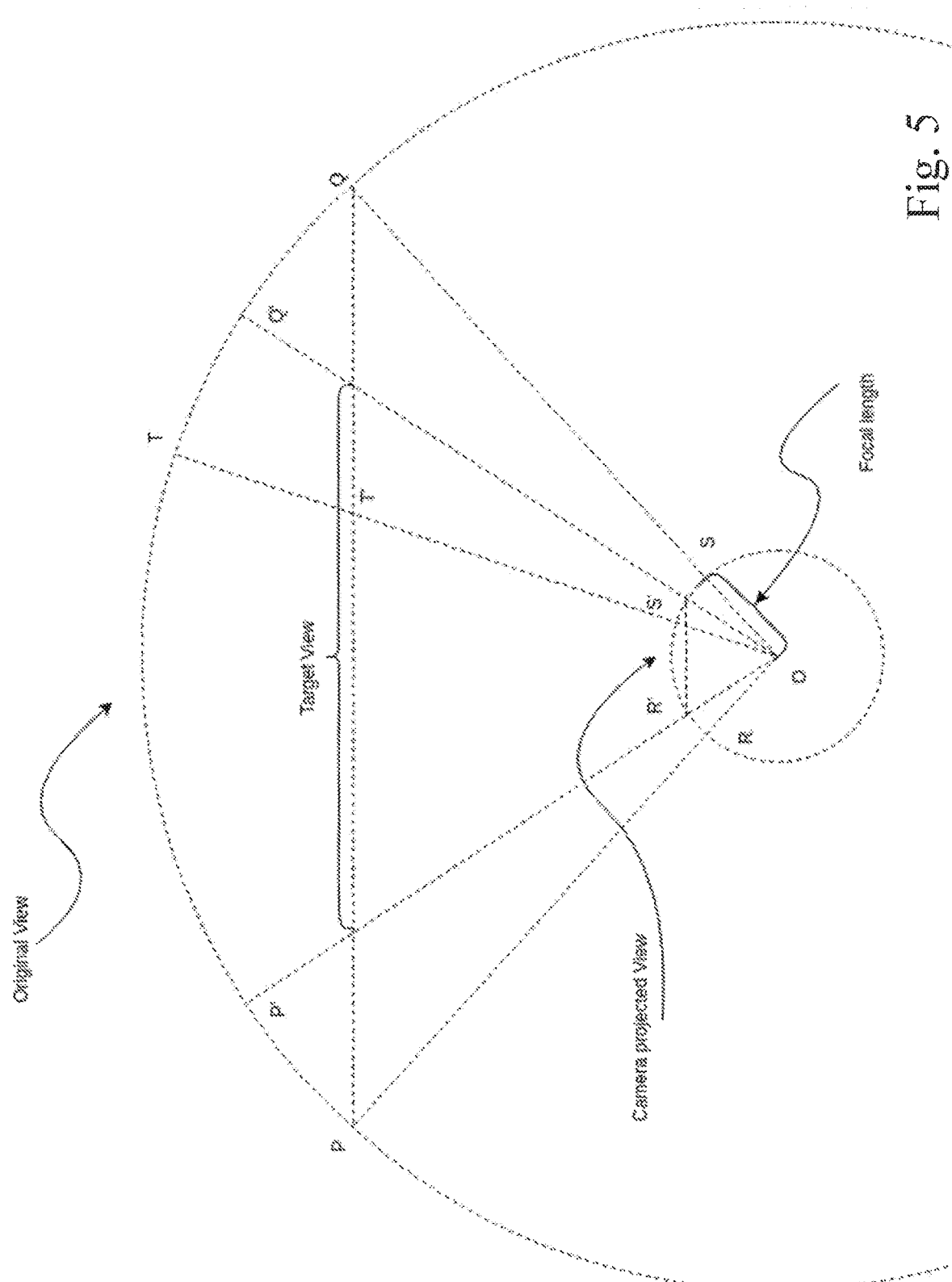
FIG. 5 illustrates a fisheye image transformation process implemented by a fisheye image processing module according to an example embodiment.

FIG. 5 illustrates a fisheye image transformation process implemented by the fisheye image processing module 200 according to an example embodiment. As shown in FIG. 5, 0 represents the camera center, line (OS) is the focal length, arc (PQ) is the original view and arc (RS) is the projected view on the camera lens. The goal in the fisheye image transformation process of an example embodiment is to warp or map the arc of the projected view on the camera lens between two points (e.g., the camera projected view) into a straight line between the same two points. For example, as shown in FIG. 5, the arc (R'S') (e.g., the camera projected view) is warped or mapped into the line (R'S'), which corresponds to arc (P'Q') in the original view. The resulting warped or mapped target view is shown in FIG. 5. Note that the target view is generally oriented orthogonally relative to a line between the camera center O and a center of the arc (R'S'). The resulting warped or mapped target view is also generally parallel to the line (R'S'), which represents the warped or mapped arc (R'S') corresponding to the camera projected view. The aperture angle (R'OS') can be specified or pre-defined as needed. However, the larger the aperture angle, the more difficult the recovery will be or the more difficult it will be to correct the distortion in the fisheye image. Because the fisheye image processing module 200 of an example embodiment uses an image split and stitch process to address local recovery error in the original fisheye image, the example embodiment can use a small aperture, such as a 100 degree aperture.

To calculate the transformation mapping, the fisheye image processing module 200 can perform a pixel mapping, which establishes a correspondence between the pixels in the original fisheye image and the corresponding pixels in the recovered or resulting image. To perform the pixel mapping, the fisheye image processing module 200 can obtain the parameters of the fisheye lens (e.g., the fisheye lens radius, the lens aperture, the focal length, the target field of view angle, etc.) as described above. In a particular embodiment, the parameters of the fisheye lens can be estimated given a sample fisheye image. The fisheye image processing module 200 can estimate the parameters of the fisheye lens by evaluating the authenticity of the recovered image based on the sample fisheye image. Some of the fisheye lens parameters can be evaluated quantitatively and thus optimized by the fisheye image processing module 200. In an example embodiment, the fisheye image processing module 200 can use the largest horizontal path in the fisheye image as the radius. In an example embodiment, the fisheye image processing module 200 can use a default lens center, which can be set to be the center pixel of the image (e.g., for a 720p image, the default is at (640, 360)). However, sometimes the circle is not located at the image center. In a particular embodiment, the fisheye image processing module 200 can take the average of or the midpoint between the end points of the longest paths to determine the center pixel (e.g., the longest horizontal path to determine the horizontal position, and the longest vertical path to determine the vertical position).

In a particular example embodiment, the fisheye image processing module 200 can also perform an optimization operation after the processing of the fisheye image is complete. In the optimization operation, the fisheye image processing module 200 can combine all of the transformations to get an end-to-end mapping. In the particular example embodiment, the fisheye image processing module 200 can determine the pixel-to-pixel correspondence between the input original fisheye image and the output resulting recovered fisheye image. From the original fisheye image, the fisheye image processing module 200 can trace every pixel's position in the final recovered image by following the transformations step by step. For each pixel in the original fisheye image, the fisheye image processing module 200 can store the pixel's position in the recovered image by use of a mapping object. Subsequently, the fisheye image processing module 200 can use a conventional Fast Fourier Transform (FFT) function to achieve a real-time transformation, thereby increasing the efficiency of the fisheye image processing as described herein.

In the example embodiment, the plurality of image portions for each image frame from the fisheye cameras of the autonomous or host vehicle can be stitched together or combined to create a single combined resulting image data set. In one example embodiment, the pixel mapping data can be used to stitch or combine the image portions into the resulting image data set. An example of this process is shown in FIG. 4. In an alternative embodiment, the fisheye image processing module 200 can identify matching portions of extracted features from each of the image portions of the original fisheye image. In the example embodiment, feature points and matching the feature points from each of the image portions of the original fisheye image can be identified. The matching feature points from each of the image portions can be used to align the image portions from each of the fisheye lens cameras.

Figure 6:
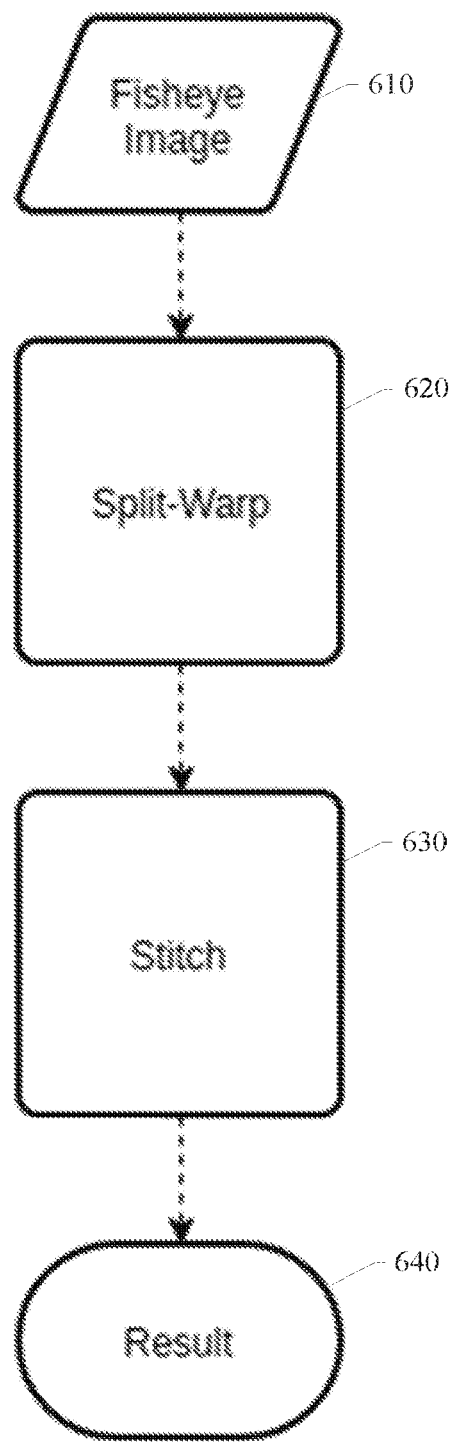
FIG. 6 illustrates an operational flow diagram illustrating an example embodiment of a system and method for processing images received from each of multiple fisheye lens cameras of an autonomous or host vehicle.

FIG. 6 is an operational flow diagram illustrating an example embodiment of a system and method for processing images received from each of multiple fisheye lens cameras of an autonomous or host vehicle. The operational flow as shown in FIG. 6 can be implemented by an embodiment of the fisheye image processing module 200. In the example embodiment shown in FIG. 6, one or more image streams or fisheye image data sets are received from a left side fisheye lens camera, a right side fisheye lens camera, a top mounted fisheye lens camera, or other fisheye lens cameras of the autonomous vehicle (block 610). As described above, the fisheye image data sets corresponding to original fisheye image frames from the fisheye lens cameras are partitioned or split into a plurality of image portions representing portions of the original fisheye image frames. Each of the plurality of image portions are transformed, as described above, to warp or map an arc of the camera projected view into a line corresponding to a mapped target view, the mapped target view being generally oriented orthogonally relative to a line between a camera center and a center of the arc of the camera projected view (block 620). In a particular embodiment, the objects in the mapped target view can be aligned based on a line parallel to a side of the autonomous or host vehicle 105. In block 630, the fisheye image processing module 200 can stitch together or combine the plurality of warped or mapped image portions for a frame of the original fisheye image to form a combined resulting fisheye image data set representing recovered (distortion reduced) fisheye image data based on images received from the multiple fisheye lens cameras of the autonomous vehicle (block 630). The combined resulting fisheye image data can be provided as an output from the fisheye image processing module 200 (block 640). Object features from the combined resulting fisheye image data sets can be extracted, identified, matched, and processed to perform various control operations for the autonomous vehicle. The extracted objects can be processed to effect vehicle trajectory planning, vehicle control, neural network training, simulation, or the like.

Figure 7:
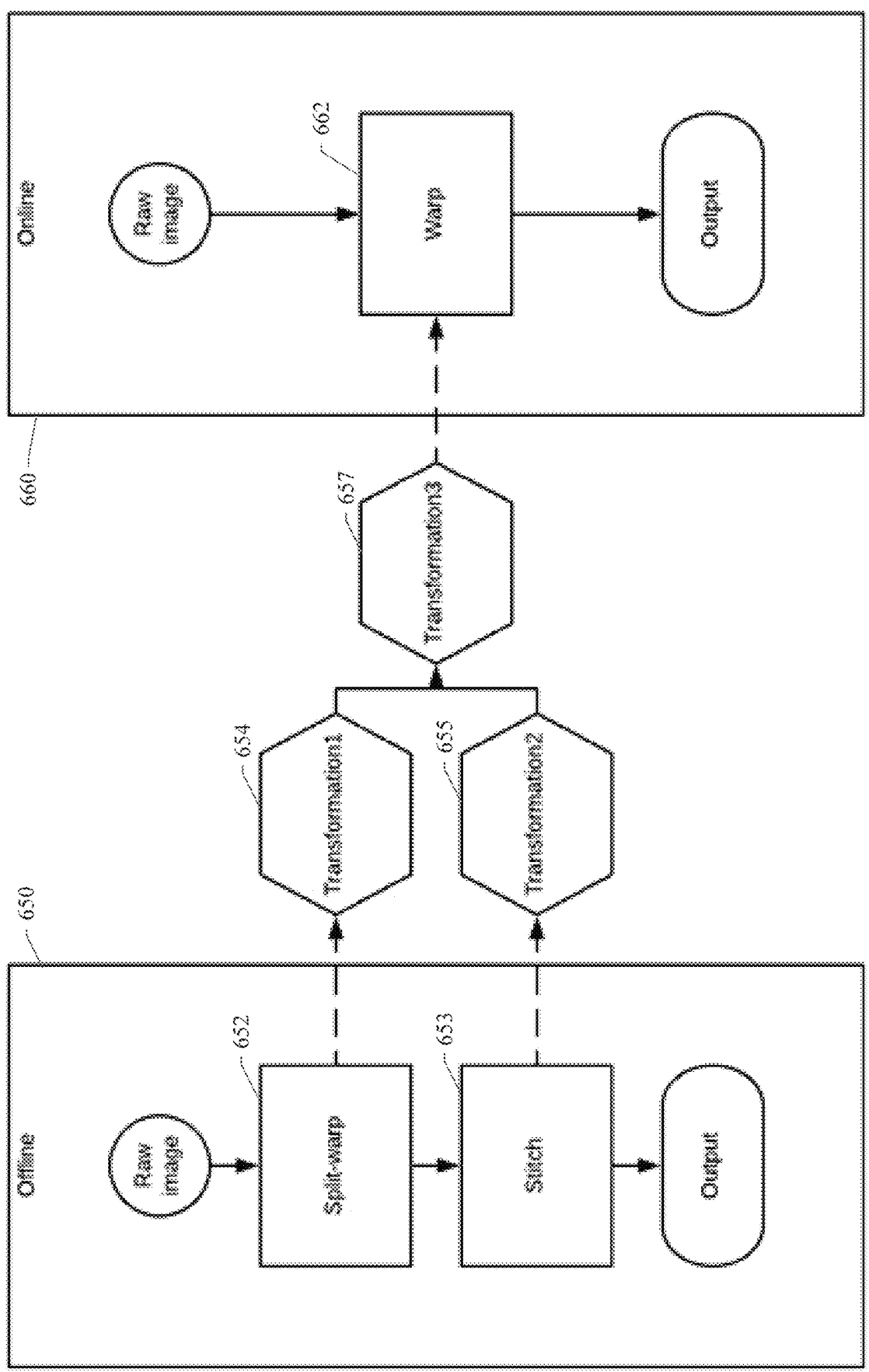
FIG. 7 illustrates another operational flow diagram illustrating an example embodiment of a system and method for processing images received from each of one or more fisheye lens cameras of an autonomous or host vehicle.

FIG. 7 is another operational flow diagram illustrating an example embodiment of a system and method for processing images received from each of one or more fisheye lens cameras of an autonomous or host vehicle. The operational flow as shown in FIG. 7 can also be implemented by an embodiment of the fisheye image processing module 200. In the example embodiment shown in FIG. 7, an offline processing stage 650 is used to pre-process frames of the original raw fisheye images to generate one or more combined image transformations, which can be more expediently used by an online processing stage 660. This process, denoted herein as the auto-configuration or auto-calibration process, enables the original raw fisheye images to be processed quickly enough to allow the fisheye image processing module 200 to be used in a real-time environment, such as an autonomous vehicle control system. The auto-calibration data produced by the auto-calibration process can be used in an online or operational processing stage to improve the latency of the original raw fisheye image processing. As shown in FIG. 7, the offline processing stage 650 can be configured to receive one or more image streams or fisheye image data sets from one or more fisheye lens cameras of the autonomous vehicle. As described above, the fisheye image data sets corresponding to original fisheye image frames from the fisheye lens cameras are partitioned or split into a plurality of image portions representing portions of the original fisheye image frames (block 652). Each of the plurality of image portions are transformed, as described above, to warp or map an arc of the camera projected view into a line corresponding to a mapped target view, the mapped target view being generally oriented orthogonally relative to a line between a camera center and a center of the arc of the camera projected view (block 654). In a particular embodiment, the objects in the mapped target view can be aligned based on a line parallel to a side of the autonomous or host vehicle 105.

Referring still to FIG. 7 at block 653 in offline processing stage 650, the fisheye image processing module 200 can stitch together or combine the plurality of warped or mapped image portions for a frame of the original fisheye image to form a combined resulting fisheye image data set representing recovered (distortion reduced or eliminated) fisheye image data based on images received from one or more fisheye lens cameras of the autonomous vehicle (block 653). The combined or stitched image data can also be processed to generate a transformation of the combined image to further reduce distortion in the combined image (block 655). Finally, the image data resulting from the transformation 654 produced by processing block 652 can be combined with the image data resulting from the transformation 655 produced by processing block 653 to generate a combined image transformation 657. The combined and transformed fisheye image data 657 or auto-calibration data generated during the offline processing stage 650 as part of the auto-calibration process can be provided as an input to the online processing stage 660.

Referring still to FIG. 7 at block 662 in online processing stage 660, the fisheye image processing module 200 can receive the combined and transformed fisheye image data 657 generated during the offline processing stage 650. The transformation data 657 generated offline can be used at block 662 to enable a fast pixel mapping or warping of the raw fisheye image data received in an online operational mode. The pre-processed transformation data 657 enables the fisheye image processing module 200 to quickly remove the distortion from a raw fisheye image frame and provide the undistorted (or distortion reduced) image data as an output to an autonomous vehicle control system for further processing. Because the fisheye image data is pre-processed and transformed multiple times during the offline processing stage 650, the combined fisheye image transformation data 657 provided to the online processing stage 660 can enable the processing of raw fisheye images in the online state 660 much more quickly. As a result, the optimized example embodiment shown in FIG. 7 can meet the response time requirements for autonomous vehicle control systems.

Embodiments that do not use the optimization or auto-calibration techniques described herein can produce fisheye image processing run times that can be very slow for intermediate-sized images. For example on 720p images, a non-optimized process can take more than 20 minutes, making the non-optimized process not applicable for autonomous driving systems, which typically require less than a 0.2 second response time. In the example embodiment illustrated in FIG. 7, the optimized operational process flow is accelerated by pre-computing the warp transformation data in each step and combining the multiple transformations into a single combined transformation. As a result, the online processing stage 660 only needs to apply the combined transformation once, thereby saving the redundant computation time for every image. In this optimized manner, example embodiments can reach real-time performance with 50 Hz per image. This approach saves computation time and eliminates a costly calibration process otherwise required to make transformations correct for all kinds of images.

Figure 8:
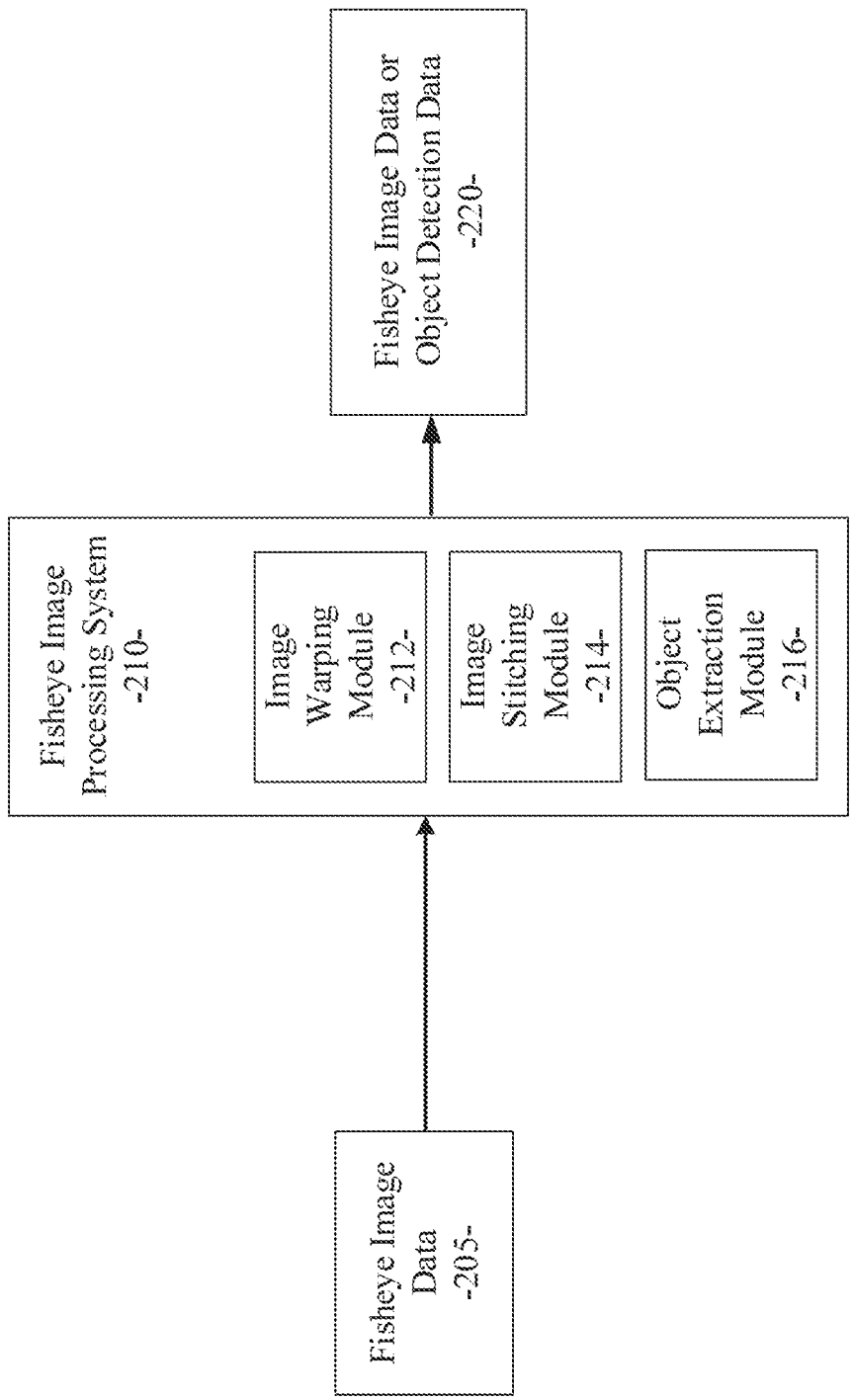
FIG. 8 illustrates an example embodiment as used in the context of a fisheye image processing system for autonomous vehicles.

Referring now to FIG. 8, an example embodiment disclosed herein can be used in the context of a fisheye image processing system 210 for autonomous vehicles. The fisheye image processing system 210 can be included in or executed by the fisheye image processing module 200 as described above. The fisheye image processing system 210 can include an image warping module 212, an image stitching module 214, and an object extraction module 216. These modules can be implemented as processing modules, software or firmware elements, processing instructions, or other processing logic embodying any one or more of the methodologies or functions described and/or claimed herein. The fisheye image processing system 210 can receive one or more image streams or fisheye image data sets from one or more fisheye lens cameras (block 205). As described above, the fisheye image data sets corresponding to original fisheye image frames from the fisheye lens cameras are partitioned or split by the image warping module 212 into a plurality of image portions representing portions of the original fisheye image frames. The image warping module 212 can then transform each of the plurality of image portions to warp or map an arc of the camera projected view into a line corresponding to a mapped target view, the mapped target view being generally oriented orthogonally relative to a line between a camera center and a center of the arc of the camera projected view. In a particular embodiment, the objects in the mapped target view can be aligned based on a line parallel to a side of the autonomous or host vehicle 105. The image stitching module 214 can be configured to use the warped or transformed plurality of image portions to stitch together or combine the warped plurality of image portions to form a combined resulting image representing recovered or distortion-reduced image data from one or more fisheye lens cameras. The object extraction module 216 can be configured to perform object extraction on the combined recovered or distortion-reduced image to identify or extract objects from the combined image. In particular, features or objects from the recovered and aligned fisheye image data can be extracted, identified, matched, and processed by the object extraction module 216 to perform various control operations for the autonomous vehicle. The fisheye image processing system 210 can provide as an output the fisheye image data or object detection data 220 generated as described above.

Figure 9:
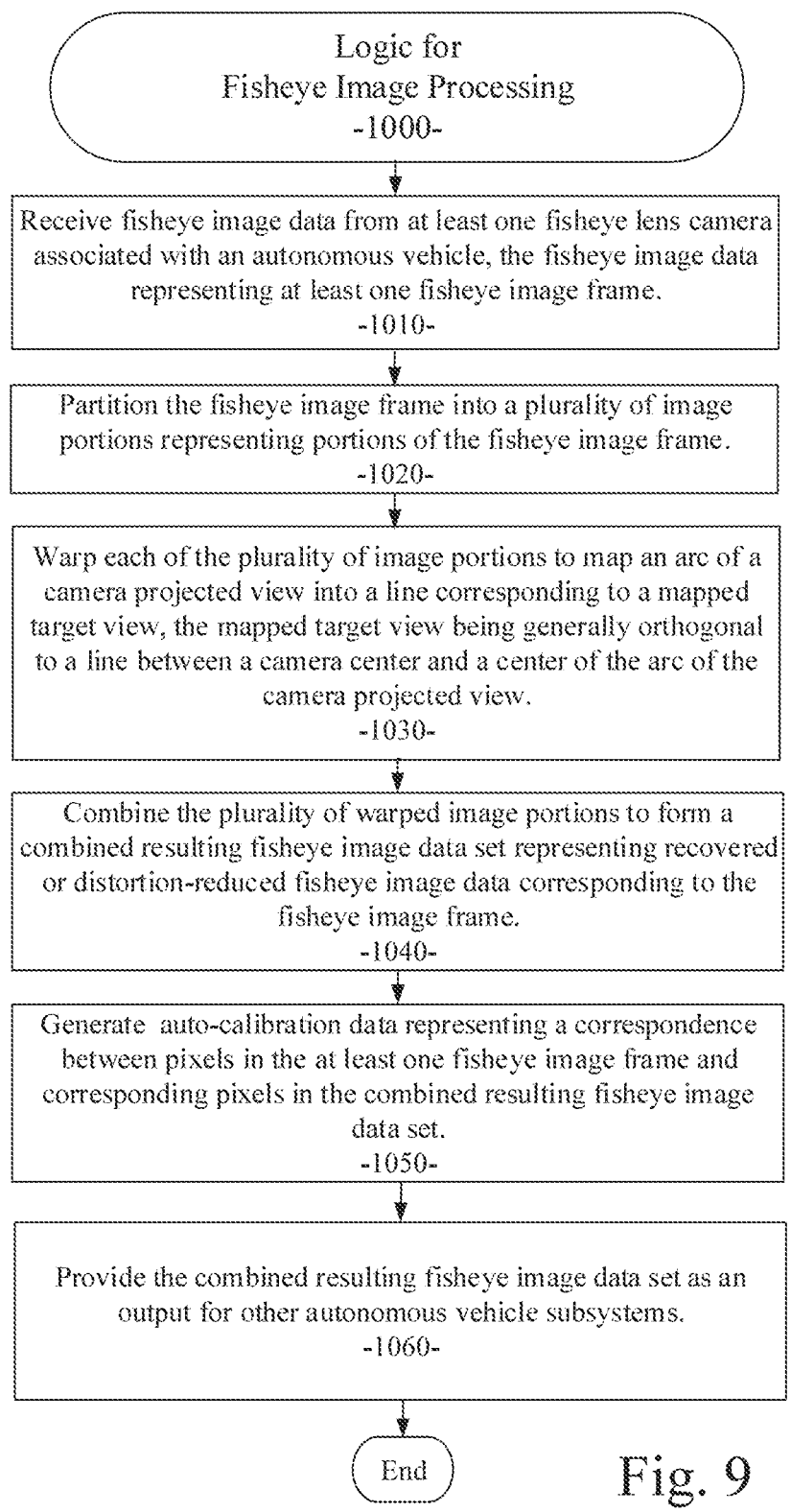
FIG. 9 is a process flow diagram illustrating an example embodiment of a system and method for fisheye image processing.

Referring now to FIG. 9, a flow diagram illustrates an example embodiment of a system and method 1000 for fisheye image processing. The example embodiment can be configured to: receive fisheye image data from at least one fisheye lens camera associated with an autonomous vehicle, the fisheye image data representing at least one fisheye image frame (processing block 1010); partition the fisheye image frame into a plurality of image portions representing portions of the fisheye image frame (processing block 1020); warp each of the plurality of image portions to map an arc of a camera projected view into a line corresponding to a mapped target view, the mapped target view being generally orthogonal to a line between a camera center and a center of the arc of the camera projected view (processing block 1030); combine the plurality of warped image portions to form a combined resulting fisheye image data set representing recovered or distortion-reduced fisheye image data corresponding to the fisheye image frame (processing block 1040); generate auto-calibration data representing a correspondence between pixels in the at least one fisheye image frame and corresponding pixels in the combined resulting fisheye image data set (processing block 1050); and provide the combined resulting fisheye image data set as an output for other autonomous vehicle subsystems (processing block 1060).

As used herein and unless specified otherwise, the term "mobile device" includes any computing or communications device that can communicate with the in-vehicle control system 150 and/or the fisheye image processing module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the fisheye image processing module 200 described herein to obtain read or write access to data signals, messages, or content communicated via any mode of interprocess or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire™, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the fisheye image processing module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the fisheye image processing module 200 can be implemented using systems that enhance the security of the execution environment, thereby improving security and reducing the possibility that the in-vehicle control system 150 and/or the fisheye image processing module 200 and the related services could be compromised by viruses or malware. For example, the in-vehicle control system 150 and/or the fisheye image processing module 200 can be implemented using a Trusted Execution Environment, which can ensure that sensitive data is stored, processed, and communicated in a secure way.

Figure 10:
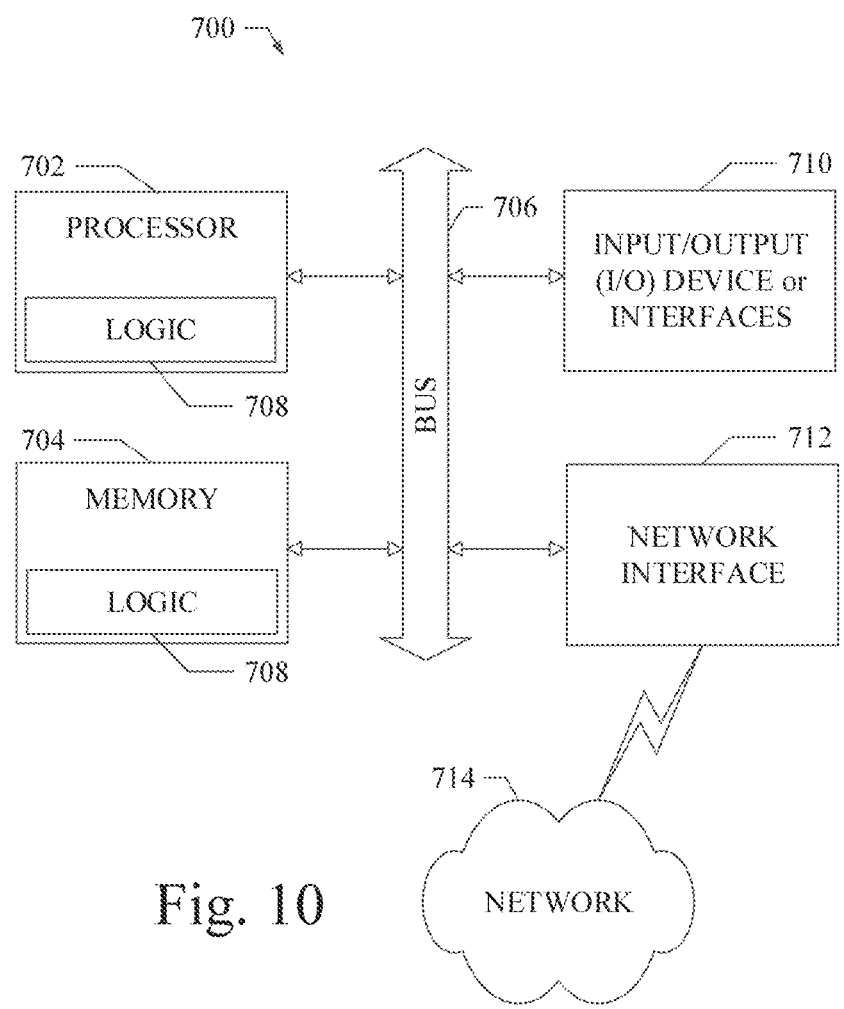
FIG. 10 shows a diagrammatic representation of machine in the example form of a computer system within which a set of instructions when executed may cause the machine to perform any one or more of the methodologies discussed herein.

FIG. 10 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth®, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
a fisheye image processing system, executable by the data processor, the fisheye image processing system comprising an offline processing stage and an online processing stage, wherein the fisheye image processing system is configured to:
receive fisheye image data from at least one fisheye lens camera associated with an autonomous vehicle, the fisheye image data representing at least one fisheye image frame;

use the offline processing stage to pre-process the fisheye image data to generate one or more combined image transformations;

use the combined image transformations as an input to the online processing stage;

quickly remove distortion from each raw fisheye image frame in a fisheye image data set provided to the online processing stage using the combined image transformations; and provide the combined resulting fisheye image data set as an output for other autonomous vehicle subsystems;

wherein the online processing stage is configured to:

partition the raw fisheye image data into a second plurality of image portions representing portions of the fisheye image frame;

warp each of the second plurality of image portions to map an arc of a camera projected view into a line corresponding to a mapped target view, the warping comprising taking auto-calibration data as an input in addition to the second plurality of image portions;

produce distortion-reduced fisheye image data; and provide the distortion-reduced fisheye image data to an autonomous vehicle control system for further processing.

2. The system of claim 1, wherein the offline processing stage is configured to:

partition each of the at least one fisheye image frame of the fisheye image data into a plurality of image portions representing portions of each fisheye image frame;

warp each of the plurality of image portions to map an arc of a camera projected view into a line corresponding to a mapped target view, the mapped target view being generally orthogonal to a line between a camera center and a center of the arc of the camera projected view; and of image portions to form the combined image transformations.

3. The system of claim 1, wherein the combined image transformations are combined into a single combine transformation, further wherein the single combined transformation is applied by the online processing stage once.

4. The system of claim 2, wherein the combined image transformations are combined into a single combine transformation, further wherein the single combined transformation is applied by the online processing stage once.

5. The system of claim 1 wherein the at least one fisheye lens camera is from the group consisting of: a left side fisheye lens camera, a right side fisheye lens camera, and a top mounted fisheye lens camera.

6. The system of claim 1 being further configured to obtain parameters of the fisheye lens camera, the parameters including a fisheye lens radius, a lens aperture, a focal length, and a target field of view angle.

7. The system of claim 1 being further configured to map pixels in the fisheye image frame to pixels in the combined resulting fisheye image data set.

8. The system of claim 1 being further configured reduce redundant computation time for each image, so that the system reaches a real-time performance of 50 Hz per image.

9. A method comprising:

receiving fisheye image data from at least one fisheye lens camera associated with an autonomous vehicle, the fisheye image data representing at least one fisheye image frame;

partitioning each frame of the at least one fisheye image frame into a plurality of image portions representing portions of the fisheye image frame;

warping each of the plurality of image portions to map an arc of a camera projected view into a line corresponding to a mapped target view, the mapped target view being generally orthogonal to a line between a camera center and a center of the arc of the camera projected view;

processing the warped plurality of image portions to produce a first transformation;

stitching together each of the warped plurality of image portions to form a combined resulting fisheye image data set;

processing the combined resulting fisheye image data set to produce a second transformation;

generating auto-calibration data representing a combination of the first transformation and the second transformation;

providing the auto-calibration data to an online processing stage of an imaging processing module;

providing raw fisheye image data from the at least one fisheye lens camera associated with an autonomous vehicle to the online processing stage;

partitioning, by the online processing stage, the raw fisheye image data into a second plurality of image portions representing portions of the fisheye image frame;

warping, by the online processing stage, each of the second plurality of image portions to map the arc of the camera projected view into a line corresponding to a mapped target view, the warping comprising taking the auto-calibration data as an input in addition to the second plurality of image portions;

producing distortion-reduced fisheye image data; and providing the distortion-reduced fisheye image data to an autonomous vehicle control system for further processing.

10. The method of claim 9 including performing object extraction on the combined resulting fisheye image data set to identify extracted objects in the fisheye image frame.

11. The method of claim 9 including aligning the mapped target view with a line parallel to a side of the autonomous vehicle.

12. The method of claim 9 wherein the at least one fisheye lens camera is from the group consisting of: a left side fisheye lens camera, a right side fisheye lens camera, and a top mounted fisheye lens camera.

13. The method of claim 9 including obtaining parameters of the fisheye lens camera, the parameters including a fisheye lens radius, a lens aperture, a focal length, and a target field of view angle.

14. The method of claim 9 including mapping pixels in the fisheye image frame to pixels in the combined resulting fisheye image data set.

15. A non-transitory machine-useable storage medium embodying instructions which, when executed by a machine, cause the machine to:

receive fisheye image data from at least one fisheye lens camera associated with an autonomous vehicle, the fisheye image data representing at least one fisheye image frame;

partition each frame of the at least one fisheye image frame into a plurality of image portions representing portions of the fisheye image frame;

warp each of the plurality of image portions to map an arc of a camera projected view into a line corresponding to a mapped target view, the mapped target view being generally orthogonal to a line between a camera center and a center of the arc of the camera projected view;
process the warped plurality of image portions to produce a first transformation;
stitch together each of the warped plurality of image portions to form a combined resulting fisheye image data set;
process the combined resulting fisheye image data set to produce a second transformation;
generate auto-calibration data representing a combination of the first transformation and the second transformation;
provide the auto-calibration data to an online processing stage of an imaging processing module;
provide raw fisheye image data from the at least one fisheye lens camera associated with an autonomous vehicle to the online processing stage;
partition, by the online processing stage, the raw fisheye image data into a second plurality of image portions representing portions of the fisheye image frame;
warp, by the online processing stage, each of the second plurality of image portions to map the arc of the camera projected view into a line corresponding to a mapped target view, wherein the auto-calibration data obtained by the online processing stage as an input in addition to the second plurality of image portions;

produce distortion-reduced fisheye image data; and
provide the distortion-reduced fisheye image data to an autonomous vehicle control system for further processing.

16. The non-transitory machine-useable storage medium of claim 15 being further configured to perform object extraction on the combined resulting fisheye image data set to identify extracted objects in the fisheye image frame.

17. The non-transitory machine-useable storage medium of claim 15 being further configured to align the mapped target view with a line parallel to a side of the autonomous vehicle.

18. The non-transitory machine-useable storage medium of claim 15 wherein the at least one fisheye lens camera is from the group consisting of: a left side fisheye lens camera, a right side fisheye lens camera, and a top mounted fisheye lens camera.

19. The non-transitory machine-useable storage medium of claim 15 being further configured to obtain parameters of the fisheye lens camera, the parameters including a fisheye lens radius, a lens aperture, a focal length, and a target field of view angle.

20. The non-transitory machine-useable storage medium of claim 15 being further configured to map pixels in the fisheye image frame to pixels in the combined resulting fisheye image data set.

* * * * *